United States Patent

Eberle

[11] 3,712,487
[45] Jan. 23, 1973

[54] APPARATUS FOR STACKING FLAT SURFACE-LIKE OBJECTS

[75] Inventor: Jurg Eberle, Zurich, Switzerland

[73] Assignee: Ferag, Fehr & Reist AG, Zurich, Switzerland

[22] Filed: Feb. 19, 1971

[21] Appl. No.: 116,954

[52] U.S. Cl. .................................. 214/6 BA, 271/87
[51] Int. Cl. .................................. B65g 57/30
[58] Field of Search .............. 214/6 BA, 7, 6; 271/87; 93/93.3

[56] References Cited

UNITED STATES PATENTS

| 2,826,413 | 3/1958 | Brodie et al. | 271/87 |
| 1,576,243 | 3/1926 | Mentges | 271/87 |
| 2,162,336 | 6/1939 | Johnstone | 214/6 BA |
| 3,591,020 | 6/1971 | Beninger | 214/6 DK |
| 1,627,791 | 5/1927 | Macy | 214/6 BA |
| 1,292,642 | 1/1919 | Pedrick | 271/87 |
| 1,113,932 | 10/1914 | Compton | 214/6 BA |
| 2,778,638 | 1/1957 | Whillock et al. | 271/87 |
| 3,596,779 | 8/1971 | Osteen | 214/6 BA |

FOREIGN PATENTS OR APPLICATIONS

| 38,185 | 11/1927 | Denmark | 214/6 BA |

Primary Examiner—Robert J. Spar
Attorney—George F. Dvorak, Stephen T. Skrydlak and Marden S. Gordon

[57] ABSTRACT

There is disclosed an apparatus for stacking substantially flat surface-like objects, particularly paper products, comprising at least one worm-like conveying element driven to rotate about its longitudinal axis and extending between an infeed station and a delivery station for the objects. According to an important aspect of the invention, the conveyor element is constructed as a spiral or screw surface traveling about a cylindrical hollow compartment.

12 Claims, 9 Drawing Figures

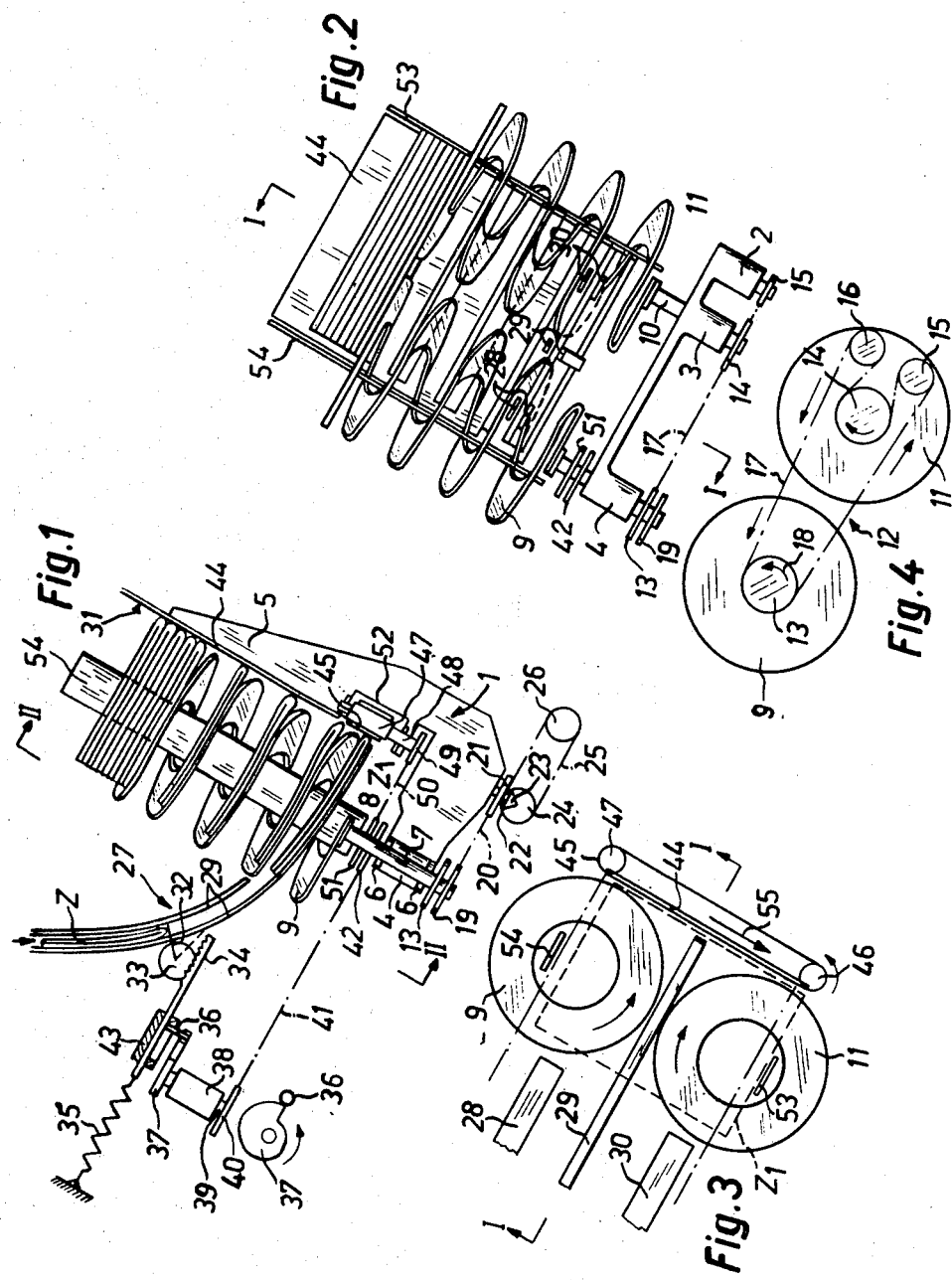

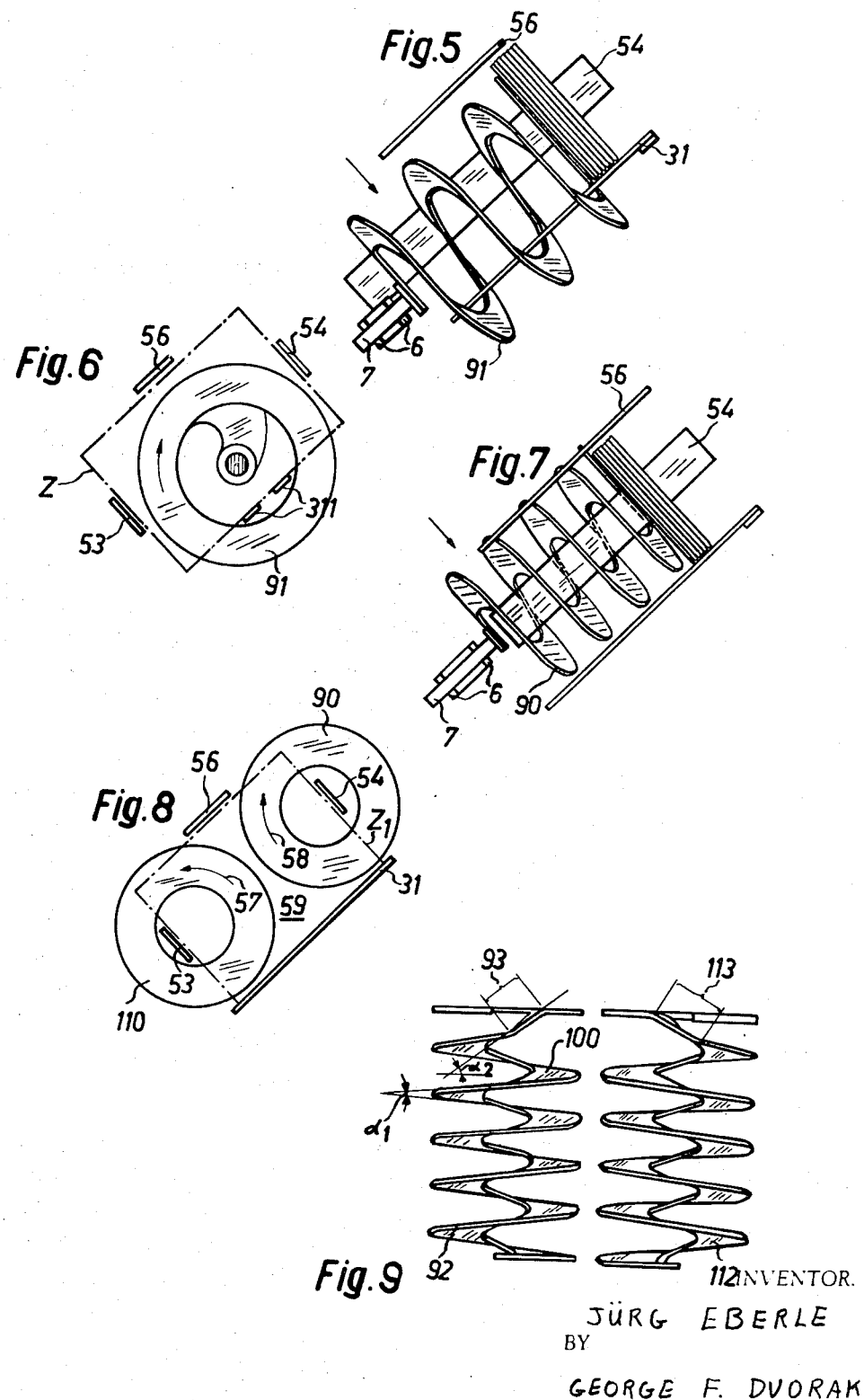

APPARATUS FOR STACKING FLAT SURFACE-LIKE OBJECTS

BACKGROUND OF THE INVENTION

The present invention relates to a new and improved apparatus for stacking substantially flat, surface-like objects, particularly paper products, through the use of at least one worm-like conveyor element driven to rotate about its longitudinal axis and extending between an infeed station and a delivery station for the objects.

The prior art is acquainted with such type apparatus which utilizes two conveyor elements, the axes of which are substantially in parallelism with one another, and wherein each conveyor element possesses a relatively thick central shaft portion from which protrudes a spiral conveyor surface having a number of windings. One such conveyor element possesses a left-handed conveying surface and the other such conveyor element then possesses a right-handed conveying surface. A guide rail constructed as a sliding track is provided between both conveyor elements, this guide rail serving to support and guide the objects introduced between the windings or coils of both conveyor elements. If the conveyor elements are driven so as to be counter-rotating, then, the object supported between the windings is conveyed along the slide track approximately in the manner of a worm press, and corresponding to the selected sense of rotation, such object is conveyed in the one or other direction until reaching the end of the conveyor elements.

The known apparatus construction discussed above is associated with drawbacks in a number of ways. Viewed in the direction of conveying of the objects the required space for the prior art apparatus is at least twice as large as the surface of the objects to be stacked, again viewed in the same direction of the equipment. This is so, because both conveying elements cannot be arranged any closer to one another than the format of the objects allows, that is, the shaft portions of both conveying elements must be spaced from one another to such an extent that the object can be inserted along its width with play between these shaft portions. Due to this design the forces transmitted from the spiral conveying surfaces directly to the conveyed objects owing to the mutual frictional contact, and which forces extend approximately perpendicular to the conveying direction, are aligned with respect to the main axis, that is, as a general rule are directed towards the slide track. If the objects which are to be conveyed are paper products, for instance individual newspaper copies, then these forces act upon the sheet of paper directly contacting the conveying surfaces and thus can crimp such sheet of paper, thereby rendering the entire newspaper copy unusable. These drawbacks have resulted in the recognition that in practice this known construction of apparatus is not readily usable.

SUMMARY OF THE INVENTION

Accordingly, there is still present a real need in the art for equipment for stacking flat objects which is not associated with the aforementioned drawbacks of the prior art constructions. Therefore, a primary objective of the instant invention is to provide just such type equipment which effectively and reliably fulfills the existing need and overcomes the aforementioned drawbacks of the prior art equipment.

Another and equally significant object of the instant invention is to provide improved apparatus of the mentioned type which overcomes the drawbacks of the prior art equipment, without sacrificing its basic advantages, namely the possibility of continuously building up the stack from "below," that is from the side of its contact surface.

Another and equally important object of the present invention relates to improved equipment for stacking relatively flat objects in an extremely reliable and efficient manner, without danger of damaging the objects or articles being stacked, and wherein the equipment is of relatively simple and economical design, and affords relatively speedy and reliable stacking operations to be performed.

Now, in order to implement these and still further objects of the invention, which will become more readily apparent as the description proceeds, the equipment or apparatus of the instant invention is constructed in such a manner that the axis of rotation of the conveyor element is located within the space available for accommodating or receiving the objects between the windings or coils of the conveyor element, in other words this axis of rotation extends through the base- or support surface of the stack.

According to an important aspect of the instant development, and in keeping with the above-mentioned purposes of the invention, the conveyor element is constructed as a spiral or helical surface which travels about a cylindrical hollow space or compartment.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a simplified side view of a first embodiment of inventive stacking apparatus, partially shown in sectional view taken along the line I—I of FIG. 2 or FIG. 3;

FIG. 2 is a cross-sectional view of the equipment depicted in FIG. 1, taken substantially along the line II—II thereof, additionally illustrating a curve disc in plan view;

FIG. 3 is a simplified plan view of the embodiment of FIGS. 1 and 2, while omitting certain components thereof to promote explanation of the mode of operation;

FIG. 4 is a simplified schematic showing of the drive arrangement for the embodiment of inventive equipment depicted in FIGS. 1 to 3;

FIGS. 5 and 6 are respective views similar to the showing of FIGS. 1 and 3 respectively, of a second embodiment of the invention;

FIGS. 7 and 8 are again respective views, similar to the showing of FIGS. 1 and 3 respectively, of a modified version of the equipment shown in FIGS. 1 to 3; and FIG. 9 is a front view of the conveying surfaces of a further embodiment of the invention.

DETAILED DESCRIPTION OF THE PREFERRED EMBODIMENTS

Describing now the drawings, the embodiment illustrated in FIGS. 1 to 4 will be seen to possess a schematically indicated frame unit 1 equipped at its lower region or portion with three bearing blocks 2, 3 and 4, and at the upper portion of the frame unit 1 there are provided a number of supports, for example two supports, of which only one such support 5 is visible in the showing of FIG. 1.

Now, at the bearing block 4 there is mounted a shaft 7 in two ball-bearings 6. Rigidly connected for rotation with the upper end 8 of the rotatable shaft member 7 is a conveying worm 9 in the form of a "centerless" or "-coreless" spiral or helical surface which, furthermore, is coaxial with respect to the shaft member 7. This conveying worm 9 is left-handed. In much the same manner a further rotatable shaft member 10 is mounted at the bearing block 3, at the upper end of which there is secured a second conveying worm 11 which is the mirror-image of the first-mentioned conveying worm 9. Conveying worm 11 is right-handed. Each of the conveying worms 9 and 11 possesses somewhat more than five coils or windings.

As best shown by referring to FIG. 4, the shafts 7 and 10 are coupled to one another through the agency of a chain drive arrangement 12. This chain drive arrangement 12 essentially embodies a sprocket wheel 13 keyed to the shaft member 7, a sprocket wheel 14 similarly keyed to the shaft member 10, two sprocket wheels or gears 15 and 16 mounted to be freely rotatable in the bearing block 2, which block possesses two bearing supports, as well as a chain 17 which is trained about these sprocket wheels or sprocket gears 13–16, as clearly shown in the illustration of FIG. 4. Thus, it will be apparent that when the sprocket wheel 13 is driven in the rotational sense indicated by the arrow 18, the other sprocket wheel 14 which is of the same size is rotated in the opposite rotational direction or sense.

Continuing, it will be understood that a driving sprocket wheel or gear 19 is keyed to the shaft member 7 in close proximity to the sprocket wheel or gear 13. The driving sprocket gear 19 is coupled in driving relationship by means of a chain 20 with a sprocket wheel or gear 21 seated upon a freely rotatable intermediate shaft 22 which, in turn, is connected via a bevel gear 23 with a further sprocket wheel 24. Sprocket wheel 24 is connected via a chain 25 to the driving wheel or sprocket gear 26, which for instance is operatively coupled with any suitable and therefore non-illustrated transmission or drive motor.

As already explained above, this driving arrangement serves the purpose of rotating both conveying worms 9 and 11 in opposite directions with respect to one another whereby in the plan view of FIG. 3 the conveying worm 11 will be seen to rotate in clockwise direction. Additionally, the reference position of both conveying worms 9 and 11 is chosen such that during each position of rotation thereof the conveying worms 9 and 11 are arranged in mirror-image relationship with respect to one another. Thus, during a rotation of the conveying worms 9 and 11 the intermediate space between the individual windings or coils of these spirals uniformly travels upwardly, that is, travels away from the shafts 7 and 10.

Now, at the region of the first coils or windings of the conveying worms 9 and 11 there is arranged an infeed station 27 for the objects, here assumed to be newspapers Z, which are to be stacked. This infeed station 27 essentially is composed of three pairs of guide rails 28, 29 and 30 which collectively provide a slide or chute for the newspapers Z. The lower rail of the guide rail pair 29 extends between both of the conveying worms 9 and 11 up to the region of a slide track 31, which is still to be described.

The infeed station 27 also possesses a release mechanism which serves the purpose of permitting release or introduction of the newspapers Z which are to be stacked at the proper moment into the operable zone of the conveying worms 9 and 11. This release mechanism is here shown to possess a pivotable stop or impact arm 32 which protrudes radially from the shaft of a gear 33. Depending upon the rotational position of the gear 33, the stop 32 is introduced into the slide defined by the guide rails 28, 29 and 30 and thus blocks the incoming newspapers, or assumes a position externally of such slide where it then can permit free passage of the incoming newspapers along such slide.

To this end, gear 33 meshes with a gear rack 34 which is mounted to be displaceable to-and-fro against the action of a restoring or return spring 35, gear rack 34 carrying a downwardly depending finger 36. This protruding finger 36 engages with a cam disk 37 shown in FIG. 1 both in side view and in plan.

Cam disk 37 is seated at a shaft member 39 which is mounted to be rotatable at location 38. A sprocket gear or wheel 40 is keyed to the shaft 39, sprocket wheel 40 being coupled in driving relationship by means of a sprocket chain 41 with a sprocket gear or wheel 42 seated upon the shaft 7. Since the sprocket wheels 40 and 42 are of the same size the cam disk 37 performs one revolution for each revolution of the conveying worms 9 and 11. In other words, for each revolution of the conveying worms 9 and 11 the stop 32 briefly frees the path formed between the guide rails 28, 29 and 30 so that the newspaper Z can slide further until it arrives at or impacts against the slide track 31.

Now, as best observed by referring to FIG. 1 this slide track or slide means 31 is attached to the upper support 5 of the frame unit 1 and forms a component of guide means which serves the purpose of retaining the newspapers conveyed between the coils or windings of the conveying worms 9,11 in their reference position with respect to these conveying worms. The slide track 31 essentially consists of a plate member 44 secured to the support 5 and an endless band 45 extending perpendicular to the lengthwise axes of the conveying worms 9,11, this endless band 45 also being disposed substantially in the same plane which contains the plate member 44. Band 45 is housed in a cut-out or recess 52 provided at the support 5 and is guided about two rollers 46 and 47 (FIG. 3). The roller 47 is seated upon a shaft 48 rotatably mounted at the support 5. The shaft 48 additionally carries a sprocket wheel 49 which is coupled in driving relationship, by means of a sprocket chain 50, to a further sprocket wheel or gear 51 seated upon the shaft 7.

Furthermore, a respective rail 53 and 54 extends through each cylindrical hollow compartment or space enclosed by the conveying worms 9,11. Each such rail 53 and 54 extends over the entire length of the associated conveying worm 11 and 9, respectively, as well as protruding past the upper respective end thereof and defines a guide surface which is disposed approximately perpendicular to the slide track or path 31. These rails 53 and 54 constitute a further component of the already mentioned guide means, in order to retain the newspapers which are elevationally conveyed by the conveying worms 9,11 in their reference position.

Finally, by referring further to FIG. 2 there will be understood and recognized that the pitch or inclination of the screw or spiral surfaces of the conveying worms 9 and 11 decreases at the region of the uppermost winding and drops to zero for about the last 180° of the last winding. Consequently, during rotation of the conveying worms 9 and 11 there appears at their upper end a support surface for the stack which is formed from below, which support surface while rotating, still practically remains flat, that is, does not have any upward inclination.

With the benefit of the previously described embodiment of the invention as depicted in FIGS. 1 to 4, the mode of operation thereof will now be considered and is as follows:

A newspaper Z released by the stop 32 slides along the guide rails 28, 29, 30 between the windings or coils of the rotating conveying worms 9 and 11 until it arrives at the revolving band 45 where such newspaper then assumes the position indicated by reference character Z1.

The spacing between the rails 53 and 54 is considerably larger than the width of the newspaper Z, and is chosen to be so in order that there is present a certain security against the leading or preceding edge of the newspapers introduced between the conveying worms becoming caught at the front edges of these rails 53 and 54. However, in order to still achieve an alignment of the incoming newspapers, the band member 45, which revolves in the direction of the arrow 55 (FIG. 3) immediately displaces the newspaper in the direction of the rail member 53 as such has been shown in FIG. 3 with the phantom-line position of the therein indicated newspaper, where such newspaper Z1 bears against rail 53. On the other hand, a considerable gap remains between the opposite edge of such newspaper Z1 and the oppositely situated or confronting rail 54. In this position, the newspaper Z1 is further elevationally raised by the conveying worms 9 and 11 up to the terminal ends of these conveying worms where the newspaper is then positively ejected and placed upon the underside of the stack of papers and such is then elevationally raised by an amount corresponding to the thickness of such newspaper.

It is to be observed that with the illustrated construction of stacking apparatus of the invention the upper end of the stack which forms is continuously accessible, so that during the stacking operation the stack can simultaneously be reduced or diminished again from the upper side or end thereof.

The direction of rotation of both conveying worms 9 and 11 causes the forces which are effective at the elevationally conveyed newspapers because of the frictional contact to possess in principle two types of components. One of these force components is directed towards the slide track 31, resulting that the newspapers will always bear against such slide track 31 even if such is arranged vertically, thereby ensuring that the effect of the band 45 is maintained. The other components of such force act approximately parallel to the slide track, whereby such, however, practically cancel one another.

Now, if the conveying worm 9 is replaced by a conveying worm which is right-handed and the conveying worm 11 replaced by a left-handed conveying worm, and if at the same time the direction of rotation of the conveying worms is reversed, then there is obtained the modified embodiment depicted in FIGS. 7 and 8. In these figures the conveying worms have been designated by reference characters 90 and 110, whereby FIG. 7 clearly shows that here the worm 90 is right-handed. In this embodiment where the worms 90 and 110 are rotated in the direction of the arrows 58 and 57, respectively, the components extending perpendicular to the slide track 31 of the frictional forces effective at the newspaper are directed away from this slide track 31. Consequently, the bearing or contact pressure of the newspaper upon the slide track 31 is less than with the embodiment of FIGS. 1 to 4. Although in the showing of FIGS. 7 and 8 there has been omitted for clarity in illustration the band 45, it should nonetheless be understood that also with this variant embodiment of the invention there may be similarly provided such a band arrangement so that the band immediately causes the arriving newspaper to bear against one of the contact rails 53 or 54. On the other hand, with this embodiment as depicted in FIGS. 7 and 8 there is provided a further contact rail 56 which, together with the contact rails 53 and 54 as well as in conjunction with the slide track 31 delimits a conveying chute or shaft 59, the cross-sectional area of which is somewhat larger than the format or size of the newspapers and for the most part is taken up by the conveying worms 9 and 110.

Apart from the advantages discussed above, the embodiment of FIGS. 7 and 8 has the additional advantage that the occurring frictional contact forces between the conveying worms and the newspapers tends to smooth or stretch the lowermost sheet of the conveyed newspaper so that possible undesired folds appearing thereat are smoothed prior to the time that such newspaper becomes part of the stack.

FIGS. 5 and 6 illustrate a further simple constructional form of the invention which works with only a single conveyor or conveying worm 91. In this embodiment, the advantage of the "centerless" or "coreless" conveying worm with regard to the spatial requirements is particularly apparent if there is compared in FIG. 6 the phantom-line indicated format of the newspaper Z with the outline of the conveying worm 91.

It will be observed that in reality the space occupied by the conveying worm 91 is not much larger than the space through which the newspaper moves when it is elevationally conveyed, which space again is delimited or bounded by the four impact or contact rails, namely the contact rails 53, 54 and 55 and the contact rail pair 311 arranged within the hollow space enclosed by the conveying worm 91.

FIG. 9 illustrates a variation of the conveying worms. Here, both of the conveying worms 92 and 112 correspond at their starting portion approximately to the construction of the conveying worms 90 and 110 of the embodiment of FIGS. 7 and 8. That is to say, they possess, with the exception of the last winding or spiral a constant pitch $\alpha_1$. Approximately at the beginning of the last winding, shown at the top of FIG. 9, the conveying worms possess a considerably larger pitch $\alpha_2$, wherein the value of $\alpha_2$ can amount to a multiple of the value of $\alpha_1$. The larger pitch $\alpha_2$, however, is only present over a section of the worm extending about through an angle of 30° to 90°, viewed from the axis of the corresponding conveying worm, and wherein each such section at the worms 92 and 112 has been indicated in FIG. 9 by the reference characters 93 and 113, respectively. After each such conveying worm section 93 and 113 the pitch of such conveying worm again drops to zero, as was the case for the worm constructions illustrated in FIGS. 1, 2 and 7.

The advantage of providing a steeper worm section, that is the sections 93 and 113, resides in the fact that almost the entire last winding can be constructed without pitch, and a sufficiently wide "throughpassage'' still remains for the elevationally conveyed newspapers. This ensures for bearing of the stack upon the stack surface formed by the last rotating coils or windings in a manner which is especially free of jarring or vibration.

In order to facilitate sliding of the coils or windings of the conveying worms at the flat sides of the objects guided by the impact rails, the surfaces of the conveying worms which are effective for the conveying action, and especially also the sides of the last windings thereof forming the stack support surface means, can be provided with a friction-reducing layer, as schematically indicated at 100 in FIG. 9, and for instance provided with a dry lubricant in the form of a coating formed of polytetrafluoroethylene or a different plastic having dry lubricating property or low coefficient of friction.

While there is shown and described present preferred embodiments of the invention, it is to be distinctly understood that the invention is not limited thereto but may be otherwise variously embodied and practiced within the scope of the following claims. Accordingly,

What is claimed is:

1. An apparatus for stacking flat objects, especially paper products, comprising at least one worm-like conveying element driven to be rotatable about its longitudinal axis, an infeed station for the objects, a delivery station for the objects, said conveying element extending between said infeed station and said delivery station, said conveying element being in the form of a helicoid surface which extends about a cylindrical hollow space, a slide track disposed opposite said infeed station and extending lengthwise adjacent said conveying element, said slide track extending along the entire length of said conveying element and serving to guide the objects which are to be stacked, an impact rail arranged in said hollow space and extending parallel to the longitudinal axis of the conveying element, said impact rail and said slide track serving to guide two side edges of the objects which are to be stacked, a driven conveyor means mounted on said slide track for movement transversely to said conveyor elements, and said driven conveyor means serving to direct the incoming objects against said impact rail.

2. An apparatus for stacking flat objects, especially paper products, comprising a first worm-like conveying element driven to be rotatable about its longitudinal axis, an infeed station for the objects, a delivery station for the objects, said first conveying element extending between said infeed station and said delivery station, said first conveying element being in the form of a helicoid surface which extends about a cylindrical hollow space, a slide track disposed opposite said infeed station and extending lengthwise adjacent said conveying element, said slide track extending along the entire length of said first conveying element and serving to guide the objects which are to be stacked, a second worm-like conveying element driven to be rotatable about its longitudinal axis, one of said conveying elements being left-handed and the other of said conveying elements being right-handed, said second conveying element being in the form of a helicoid surface which extends about a cylindrical hollow surface, an impact rail arranged in each hollow space and extending parallel to the longitudinal axis of the associated conveying element, both of said impact rails serving to guide two oppositely situated side edges of the objects which are to be stacked, a driven conveyor means mounted on said slide track for movement transversely to said conveying elements, and said driven conveyor means serving to direct the incoming objects against one of said impact rails.

3. The apparatus as defined in claim 2, wherein the pitch of the last winding of each of said conveying elements located at the region of said delivery station is less than the pitch of the remaining windings of said spiral surface defining said conveying elements.

4. The apparatus as defined in claim 3, wherein the last winding of said conveying element approximately over the last 270° sector thereof possesses a pitch amounting to about 0° so as to provide a substantially flat supporting surface at the top of the conveying elements while they are rotating.

5. The apparatus as defined in claim 3, wherein the last winding of each of said conveying elements over the approximate last 270° sector of each has a pitch of about 0°, and the remaining portion of each of the last windings over the approximate first 90° sector of each has a greater pitch than the pitch of the remaining windings of said conveying elements.

6. The apparatus as defined in claim 2, wherein the side of said spiral surface of each of said conveying elements which is effective for the conveying action is provided with a coating formed of a dry lubricant.

7. The apparatus as defined in claim 2, further including an object blocking mechanism for controlling infeed of the objects to be stacked provided for said infeed station, said infeed station including a slide track leading to the operable zone of said conveying elements, and means for synchronously driving said object blocking mechanism with each of said conveying elements so that during each revolution of said conveying elements said slide track leading to the operable zone of said conveying element is briefly unblocked permitting an object to be released onto said conveying elements.

8. The apparatus as defined in claim 1, wherein the pitch of the last winding of said conveying element located at the region of said delivery station is less than the pitch of the remaining windings of said spiral surface defining said conveying element.

9. The apparatus as defined in claim 8, wherein the last winding of said conveying element approximately over the last 270° sector thereof possesses a pitch amounting to about 0° so as to provide a substantially flat stack supporting surface at the top of the conveying element while it is rotating.

10. The apparatus as defined in claim 8, wherein the last winding of said conveying element over the last approximate 270° sector thereof has a pitch of about 0°, and the remaining sector of the last winding over the approximate first 90° thereof has a greater pitch than the pitch of the remaining windings of said conveying element.

11. The apparatus as defined in claim 1, wherein the side of said spiral surface of said conveying element which is effective for the conveying action is provided with a coating formed of a dry lubricant.

12. The apparatus as defined in claim 1, further including an object blocking mechanism for controlling infeed of the objects to be stacked provided for said infeed station, said infeed station including a slide track leading to the operable zone of said conveying element, and means for synchronously driving said object blocking mechanism with said conveying element so that during each revolution of said conveying element said slide track leading to the operable zone of said conveying element is briefly unblocked permitting an object to be released onto said conveying element.

* * * * *